June 11, 1957 B. S. VILKOMERSON 2,795,733

SIGNAL GENERATING SYSTEMS

Filed March 10, 1953

INVENTOR.

Benjamin S. Vilkomerson

BY [signature]

ATTORNEY 2,795,733

SIGNAL GENERATING SYSTEMS

Benjamin S. Vilkomerson, Camden, N. J., assignor to Radio Corporation of America, a corporation of Delaware Application March 10, 1953, Serial No. 341,523

11 Claims. (Cl. 315—27)

Figures 1, 2:
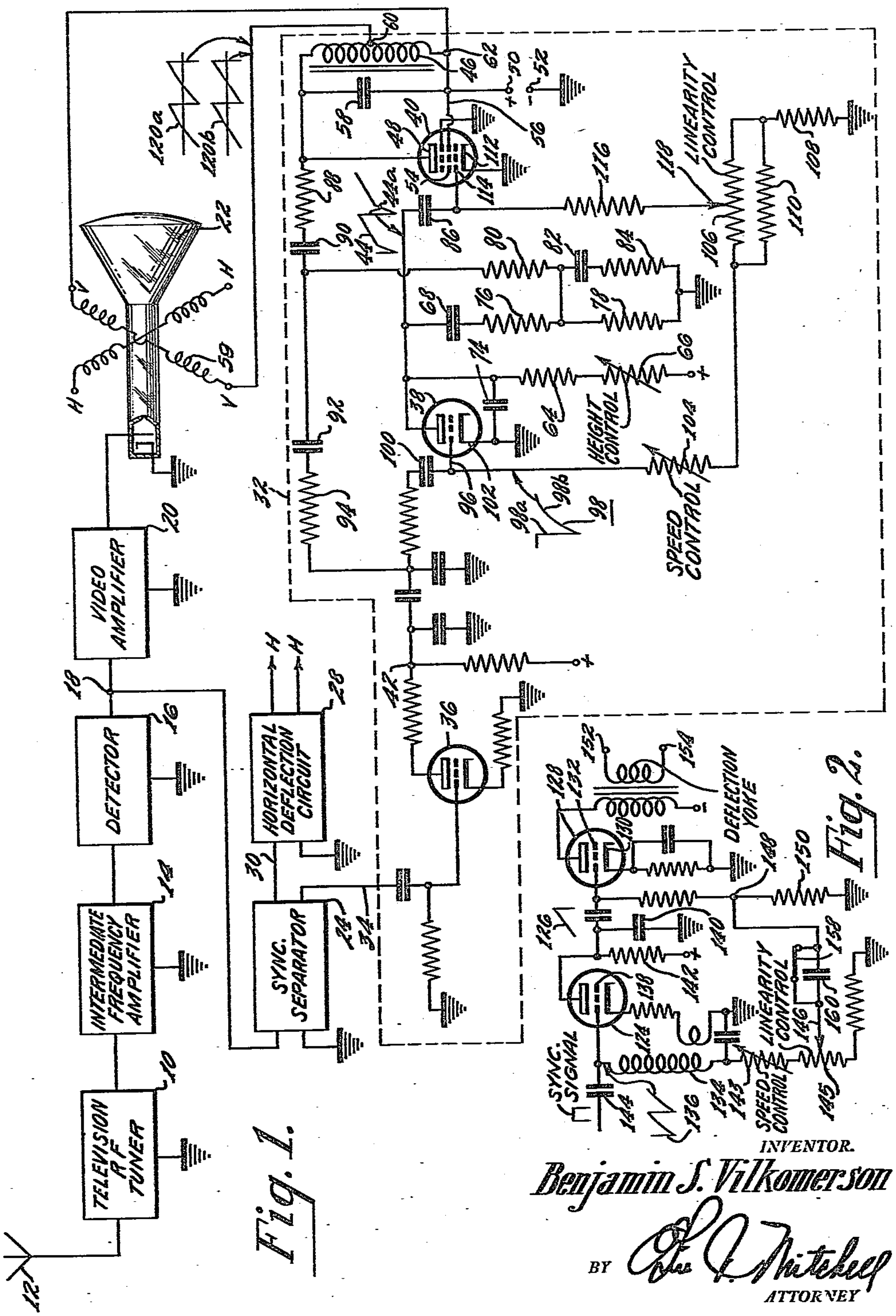

The present invention relates to improvements in electrical signal generating systems of the type adapted to deliver substantial power with a predetermined signal waveform.

In more particularity, although not necessarily exclusively, the present invention relates to improvements in deflection signal generating circuits for cathode ray beam deflection system utilization, as, for example, employed in modern day television receiving systems.

In the electronic art, the occasion arises quite frequently where a rather large amount of signal power is required at a predetermined signal waveform. In such cases, the signal waveform is often developed at a low power low level signal generator stage and applied to a power amplifying instrumentality which is capable of delivering considerable signal power at a possible sacrifice of voltage gain. It is sometimes found that the inherent characteristics of a particular power amplifying instrumentality requires appreciable driving current. This requirement taken in combination with a high impedance signal coupling system employed to apply signal to the power amplifier results in certain signal waveform distortions which may upon occasion be of serious proportions.

In the television art, for example, it is commonplace to develop considerable rather large signal powers in the electromagnetic deflection of the cathode ray beam in a picture reproducing kinescope. In such circuits, it is common practice to develop the deflection waveform, usually of sawtooth shape by a blocking oscillator, multivibrator or sawtooth discharge tube circuit. The signal waveform is then capacitively coupled, in most cases, to an electron discharge tube whose anode circuit is transformer coupled to a deflection yoke of suitable design. It is the purpose of this electron discharge tube to provide considerable deflection power to the deflection yoke in order to accomplish the required electron beam scanning action. As cathode ray beam picture tubes or kinescopes increase in size, due to the public demand for larger television pictures, the power requirements for beam deflection increase too. This puts a burden on available commercial electron tube types suitable for home instrument use to supply the necessary deflection power without exceeding the linear amplification characteristics of the tube.

One illustration of the significance and proportions of the difficulties encountered as a result of higher deflection power demands in modern day television circuits, is the often observed tendency for home television pictures to be non-linear in their lower or bottom extremities. In most commercial television receiving circuits, this non-linearity or compression is indicative of the heavy burden being placed on the vertical deflection signal output tube. To alleviate this problem, some circuit designs have incorporated complex distortion correction feedback circuits supplemented by rather elaborate means for increasing the available power supply potential to the vertical deflection output stage. By such means, adequate correction of the linearity of the vertical deflection signal can be realized only at a considerable expense.

It is, therefore, an object of the present invention to provide an improved signal power amplifying system which is capable of delivering considerable signal power at a minimum of signal distortion.

It is further an object of the present invention to provide an improved signal amplifying system which realizes the full power handling capabilties of a given electron discharge tube type.

It is a further object of the present invention to provide an improved cathode ray beam deflection circuit which is eminently suited for wide angle high power deflection without sacrificing deflection linearity.

It is a still further object of the present invention to provide a simple, low-cost yet highly efficient cathode ray beam deflection signal generation and amplifying system which is suited for application in deflection systems requiring a high degree of signal linearity at a considerable power level.

In the realization of the above objects and features of advantage, the present invention, in one of its more general embodiments, embraces an electron discharge tube having signal input circuit means for supplementing the desired signal with a distortion correction signal. The distortion correction signal is of such waveform character as to compensate the signal delivered by the amplifier for distortion imposed upon the desired signal by the discharge tube characteristics and circuit characteristics preceding the discharge tube.

In a preferred embodiment of the present invention involving a cathode ray beam deflection circuit, operating bias for the deflection output tube is developed by grid current flow in the deflection output driver stage. Grid bias developed in such a manner contains a corrective waveform which extends the operating range of the deflection output tube as well as permitting higher operating efficiency due to permissible grounded cathode operation of the output tube.

Other objects and features of advantage of the present invention will be clear from a reading of the following specification, especially when taken in connection with the accompanying drawings, in which:

Figure 1 is a combination block diagram and schematic representation of one embodiment of the present invention; and Figure 2 is a schematic representation of another embodiment of the present invention.

Although the present invention will be described hereinafter with particular reference to cathode ray beam deflection systems, it will become apparent as the teaching proceeds, that the novel principles underlying the present invention are in no way limited in their utility to cathode ray beam deflection systems, per se.

Turning now to Figure 1, there is shown in block form at 10 a television R. F. tuner element incorporating well known superheterodyne receiving components. Television signals are applied to the tuner 10 from the antenna 12. The intermediate frequency version of the incoming television signal as produced by the tuner 10 is applied to an intermediate frequency amplifier 14 whose output signal is in turn applied to a well known detector element 16. In accordance with well known practice, a demodulated television signal will then appear at the output terminal 18 of the detector 16. This signal is applied to the video amplifier 20 whose output circuit is arranged to modulate or control the intensity of the electron beam of a picture reproducing cathode ray beam kinescope 22.

In further accordance with well known television receiver design techniques, the video signal appearing at terminal 18 is applied to some form of sync separator circuit 24 whose purpose it is to remove synchronizing signal components from the incoming video signal and suitably process them for application to horizontal and vertical deflection circuits. Accordingly, separated horizontal synchronizing signal, or horizontal "sync," as it is known, is applied to the horizontal deflection circuit 28 via circuit path 30. Vertical synchronizing signal is in turn applied to the vertical deflection circuit shown in dotted line area 32 via the circuit path 34. It is the circuit arrangement within the dotted line area 32 with which the present invention is involved.

The vertical deflection circuit enclosed in the dotted line area 32 includes electron discharge tubes 36, 38 and 40. Discharge tube 36 acts as a well known sync amplifier tube which receives the incoming vertical sync as it appears on circuit path 34 and amplifies it for delivery to the synchronizing signal input terminal 42. Discharge tubes 38 and 40 are connected in a well known multivibrator circuit arrangement of a type which delivers a sawtooth signal such as 44 to the discharge tube 40. The output circuit of discharge tube 40 includes the auto transformer 46 whose extremities are connected between the anode 48 of tube 40 and a positive power supply terminal 50. Terminal 50 is indicated as being positive with respect to circuit ground which is in turn provided with a negative terminal at 52. Positive operating potential for the screen electrode 54 of the pentode tube 40 is applied via the circuit path 56. Capacitor 58 is connected in shunt with the auto transformer 46 in order to reduce the deleterious effects of horizontal deflection circuit energy, capacitively and inductively coupled from the horizontal deflection yoke winding to the vertical deflection yoke winding. In accordance with prior art practice, the vertical deflection yoke winding 59 embracing the neck of the kinescope 22 is connected to the taps 60 and 62 on the auto transformer 46.

Details of the operation of the multivibrator circuit in which tubes 38 and 40 act to develop the sawtooth waveform 44 need not be given here due to the widespread knowledge of such circuit types. The operating mode of such a circuit is discussed in a publication entitled "Television Receivers—Models 2T51 and 2T60—Service Data" made available to the public by the Radio Corporation of America, RCA Victor Division, in November 1950. This circuit arrangement is further described in the "Rider's Television Service Manual," volume 7, RCA pages 1 to 16.

Briefly, the triode tube 38 is connected as a sawtooth discharge tube having resistance elements 64 and 66 as a charging resistance. Sawtooth charging capacitor 68 is supplemented in its action by a capacitor 74. Resistance element 76 taken in combination with resistance elements 78 and 84 comprise the well known peaking resistance. In practice, resistor 78 is sufficiently large to be neglected in considering its peaking effect. A linearizing feedback circuit is also provided through the agency of resistor 80 acting in combination with capacitor 82, resistor 84 and resistor 78. These latter elements permit some of the signal developed in the output circuit of the amplifier tube 40 to be fed back in a distortion-correcting manner to the input circuit of the tube 40. The sawtooth signal 44 which is developed at the upper terminal of capacitor 68 is capacitively coupled via capacitor 86 to the control electrode of the discharge tube 40. Inasmuch as signal is coupled via the resistor 88, capacitor 90, capacitor 92 and resistor 94, to the input circuit of discharge tube 38, blocking type oscillations will be maintained between tube 38 and tube 40. The positive going excursions of the signal fed back from the anode 48 of tube 40 to the control electrode 96 of tube 38 will cause grid current conduction in the tube 38 which will subsequently result in a negative voltage on the control electrode 96 due to grid current charging of condenser 100. The waveform of this voltage is of the typical blocking oscillator variety illustrated at 98. The time constant of condenser 100 taken in combination with the total resistance between the control electrode 96 and the cathode 102 will determine the operating frequency of the oscillator multivibrator. In order to permit the speed of the multivibrator to be adjustably rendered slower than the incoming sync a speed control resistance means is shown at 104.

According to the present invention, the grid leak current flow in the discharge tube 38 is made to develop a useful bias voltage. In the arrangement of Figure 1, this is accomplished by the resistance means 106 connected in series with speed control resistor 104 to ground potential through a resistance element 108. A fixed resistance 110 is placed in shunt with the potentiometer element 104 to control the range of linearity correction afforded by the control 106. The cathode 112 of output discharge tube 40 is connected directly with ground potential while the control electrode 114 is connected through a suitable grid leak resistance 116 to the movable tap 118 on potentiometer 106.

In the embodiment of the present invention shown in Figure 1, it will be seen that the waveform 98 developed at the control electrode 96 of tube 38 will appear in part at the tap 118 of potentiometer 106. Since the leading edge 98*a* of the waveform 98 corresponds with the retrace portion of the deflection cycle indicated at 44*a* of waveform 44, it is evident that the bias on tube 40 will become increasingly positive throughout the duration of any given sawtooth cycle. This will in effect increase the gain of the amplifier tube 40 toward the end of the deflection cycle and produce a degree of signal expansion for the positive going portions of the sawtooth signal.

The effects produced by the novel operation of the present invention is shown by waveforms 120A and 120B representing the deflection current through the vertical deflection winding 58. It will be noticed that the upper or positive going extremities of waveform 120*a*, typical of deflection current flow produced by prior art circuits is compressed. This compression results, in prior art arrangement, from a number of circuit limitations chief among which are the size of capacitive and resistive coupling elements which can be tolerated in coupling the generated sawtooth to the output stage 40 and the nonlinear tube operating characteristics of tube 40 in its circuit environment as the tube is urged into higher power operation. The waveform 120*b*, however, illustrates the current waveform produced by the embodiment of the present invention in a deflection system. The decreased negative bias on the deflection output stage toward the end of the deflection cycle overcomes the compression of the positive going sawtooth extremities, and results in a current waveform of good linearity. By controlling the amount of voltage waveform 98 fed back or superimposed upon the sawtooth signal input to tube 40 and the mean value of operating bias of the output tube control electrode, various degrees of linearity control can be realized. For this reason the potentiometer 106 has been indicated as a linearity control.

Another novel feature of the present invention, as illustrated in the embodiment of Figure 1, rests in the ability to operate the power output tube with a grounded cathode connection. This eliminates the need for tolerating a voltage drop across a cathode biasing resistor almost uniformly used in the prior art vertical deflection output amplifiers. The increase in effective anode-cathode power supply potential which follows from the ability to directly ground the cathode, results in some instances in a thirty-five percent increase in operating deflection capability. The proper bias potential for the control electrode 114 is, of course, adjustable by the tap 118 of potentiometer 106. By designing the value of resistor 110 relative to the value of potentiometer resistance 106, taken in combination with the remaining circuit resistance through which grid leak current of tube 38 is caused to flow, the bias range available to the grid 114 may be determined.

Another embodiment of the present invention is shown in Figure 2. Here a typical blocking oscillator stage 124 is employed to generate a sawtooth waveform 126 for application to a triode deflection output stage 128. Here again, the novel features of the present invention permit the cathode 130 of tube 128 to be directly grounded instead of suffering a net anode-cathode voltage drop through a cathode bias resistor. Bias for the control electrode 132 is supplied by grid leak current from the blocking oscillator tube 124. The blocking oscillator based upon tube 124 is conventional in nature and employs a blocking oscillator transformer 134 which regeneratively couples anode-cathode currents to the input circuit of the tube. This produces the well known blocking oscillator waveform 136 on the control electrode 138. Since the tube 124 is effectively cut off during the major portion of the deflection cycle, a sawtooth forming capacitor 140 is periodically charged through resistor 142 and discharged through tube 124 when it conducts. This produces the previously referenced sawtooth waveform 126. The speed of the blocking oscillator is controlled in a well known fashion by variable resistance element 143 which permits the time constant of the control electrode circuit based upon capacitor 144 to be varied.

According to the present invention, the grid lead current which is produced in the control electrode circuit of tube 124 produces a negative voltage across the linearity control potentiometer 145. This negative voltage is conveyed via circuit path 146 to a tap 148 in the control electrode circuit of tube 128. A part of the blocking oscillator waveform 136 will, of course, appear across the resistance element 150 and thereby act as a linearizing control in a fashion described in connection with Figure 1. The resulting deflection signal appearing across terminals 152 and 154 of the output transformer 156 may be conventionally applied to an electromagnetic deflection yoke, as illustrated in Figure 1

It will be apparent from the above description of the present invention that the novel features thereof are in no way limited to cathode ray beam deflection circuits or specifically to vertical cathode ray beam deflection circuits. The novel output tube biasing arrangement and linearity correction circuit may be applied to horizontal deflection amplifiers and, indeed, may be applied to other types of signal amplifiers designated for handling of signal waveforms other than those employed in cathode ray beam deflection systems. It is further to be understood that the present invention is not limited to the combination supply of both linearity correction signals and bias voltage to an output stage. By applying suitable capacitance bypass elements to resistance elements 106 and 150 in Figures 1 and 2 respectively, the linearity control feature of the present invention can be eliminated at the same time taking full advantage of the bias supply feature which permits more efficient operation of the output tube. On the other hand, by capacitively coupling the linearity correction waveform from the blocking oscillator stage of Figure 2 to the control electrode input circuit of the output tube 128, it is possible to realize the linearity correction aspects of the present invention without imposing a negative bias on the output stage. Purely for purposes of illustrating this feature of the present invention, the normally closed switch element 158 in Figure 2, which switch element bypasses capacitance element 160, may be opened.

What is claimed is:

1. In a signal amplifying system, the combination of: a first and a second electron discharge tube each having at least an anode, cathode and control electrode; signal coupling means connected from the anode of said first electron discharge tube to the control electrode of said second electron discharge tube; bias means connected to said first electron discharge tube control electrode for developing a control bias in accordance with the conditional flow of control electrode current therefrom; and signal coupling means connected from said bias developing means to said second electron tube control electrode for biasing said second electron tube control electrode in accordance with said developed bias.

2. In a signal amplifying system, the combination of: a first electron discharge tube having at least an anode, cathode and control electrode; a first signal input circuit coupled between said control electrode and said cathode, including a resistance means; a signal input terminal designated to receive driving signals for said first electron discharge tube having sufficiently positive excursions as to conditionally produce grid current flow in said first electron discharge tube; signal coupling means from said signal input terminal to said control electrode; a second electron discharge tube having at least an anode, cathode and control electrode; signal load utilization means connected with said second discharge tube anode and said second discharge tube cathode; alternating current signal coupling means connected from said first electron discharge tube anode to said second electron discharge control electrode; and direct current coupling means connected from said first electron discharge tube input circuit resistance means to said second electron discharge tube control electrode.

3. In an electrical signal generating system, the combination of: a first amplifier device having an input circuit and output circuit; a second amplifier device having an input circuit and output circuit; signal coupling means from the output circuit of said first signal amplifying device to the input circuit of said second amplifying device; regenerative feedback means connected from the output circuit of said second amplifying device to the input circuit of said first amplifying device, said feedback means being so proportioned as to cause current flow in said first signal amplifying device input circuit; means connected in said first amplifying device input circuit responsive to current flow therein to develop a control signal; and means operatively connected from said last named means to said second amplifying device input circuit for applying said control signal to said second amplifying device input circuit.

4. In an electrical signal amplifying system, the combination of: a first electron discharge tube having an input electrode connected with an input circuit, and an output circuit; a second electron discharge tube having an input circuit and output circuit; signal coupling means from the output circuit of said first electron discharge tube to the input circuit of said second electron discharge tube; a source of electrical signal of sufficient amplitude as to cause current flow in said input electrode circuit when applied thereto; signal coupling means from said signal source to said first electron discharge tube input circuit; current responsive means connected in said first electron discharge tube input circuit for developing a control voltage in accordance with the conditional flow of input electrode current therethrough; and voltage coupling means connected from said current responsive means to the input circuit of said second electron discharge tube for applying said developed control voltage to the input circuit of said second electron discharge tube.

5. In an electrical signal amplifying system according to claim 4 wherein said voltage coupling means is of the galvanically conducting variety.

6. In an electrical signal amplifying system according to claim 4 wherein said voltage coupling means has a relatively high direct current resistance but a relatively low alternating current impedance.

7. In an electrical circuit system, the combination of: a first electron discharge tube having at least an anode, control grid and cathode; electrical circuit means connected with said anode, cathode and control grid for producing periodic oscillations in said discharge tube of such an amplitude as to produce control grid current flow in said discharge tube; means connected with said discharge tube control grid responsive to grid leak current flow to produce a control voltage; a second electron discharge tube having at least an anode, cathode and control electrode; alternating current signal coupling means operatively connected from said first electron discharge tube anode to the control electrode of said second electron discharge tube for exciting said second electron discharge tube with oscillations from said first electron discharge tube; signal coupling means connected from said grid leak current responsive means to said second electron discharge tube control electrode and an output circuit signal utilization means connected between said second electron discharge tube anode and said second electron discharge tube cathode.

8. In an electrical circuit system according to claim 7 wherein said first electron discharge tube is connected as a blocking oscillator.

9. In a cathode ray beam deflection system, the combination of: a first electron discharge tube having at least an anode, cathode and control electrode; a signal input circuit connected between said control electrode and said cathode; sawtooth signal forming means connected between said anode and said cathode; a second electron discharge tube having at least an anode, cathode and control electrode; signal coupling means connected from said sawtooth forming means to said second electron discharge tube control electrode; cathode ray beam deflection means connected between said second electron discharge tube anode and cathode; resistance means connected in said signal input circuit of said first electron discharge tube to develop a control voltage there-across in response to current flow in said input circuit; and signal coupling means connected from said last named means to said second electron discharge tube control electrode.

10. In a cathode ray beam deflection system according to claim 9 wherein said signal coupling means connected between said current responsive means and said second electron discharge tube control electrode is of the galvanically conductive variety whereby the bias on the control electrode of said second electron discharge tube is rendered a function of input circuit current of said first electron discharge tube.

11. In a cathode ray beam deflection system according to claim 9 wherein there is additionally provided signal feedback means connected from the anode circuit of said second electron discharge tube to the input circuit of said first electron discharge tube of such a nature as to maintain cyclic oscillation between said first and second electron discharge tubes.

References Cited in the file of this patent

UNITED STATES PATENTS

| | | |
|---|---|---|
| 2,074,033 | Tolson | Mar. 16, 1937 |
| 2,229,674 | Richards | Jan. 28, 1941 |
| 2,545,346 | Edelsohn | Mar. 13, 1951 |
| 2,621,237 | Huntley | Dec. 9, 1952 |
| 2,654,855 | Denton | Oct. 6, 1953 |